United States Patent Office 2,944,995
Patented July 12, 1960

2,944,995
ACCELERATION OF THE PEROXIDE CURE OF HEXAFLUOROPROPYLENE-VINYLIDENE FLUORIDE ELASTOMER WITH METHYLENE BISACRYLAMIDE

Lucian P. Dosmann and Gerald L. Barnes, South Bend, Ind., assignors to United States Rubber Company, New York, N.Y., a corporation of New Jersey No Drawing. Filed May 15, 1959, Ser. No. 813,345

7 Claims. (Cl. 260—41)

This invention relates to an improved method of curing an elastomeric copolymer of hexafluoropropylene and vinylidene fluoride with a peroxy compound, involving carrying out such cure in the presence of N,N'-methylenebisacrylamide.

It has previously been proposed to "cure" or "vulcanize" hexafluoropropylene-vinylidene fluoride elastomeric copolymer with peroxy compounds and certain other agents. Being a fully saturated elastomer, this copolymer is not readily vulcanized by the more usual rubber curatives. The chemistry of the peroxide cure of this saturated elastomer is not fully understood, but the marked increase in strength and solvent resistance after cure indicates that the copolymer undergoes during cure some sort of chemical change, producing a network or cross-linked type of structure.

Unfortunately, the conventional peroxide cure of the hexafluoropropylene-vinylidene fluoride copolymer has a serious practical disadvantage, in that it is extremely difficult to cure even thin films of the copolymer without development of porosity. Evidently volatile decomposition products are formed which have difficulty in diffusing to the surface of the stock as rapidly as they are generated. The cured products therefore tend to have an unsatisfactory appearance and poor physical properties, because of the voids or bubbles formed during such peroxide cure. To mitigate this disadvantage it has been recommended to carry out the cure very slowly, for example, it is suggested to initiate the cure by heating for 30 minutes at 230° F. in a mold, after which the cure is completed by heating the article in an oven at 300° F. for prolonged periods, of up to 16 hours, depending on the thickness of the article. The necessity for such impracticably prolonged curing conditions has seriously limited the development of useful commercial products from the hexafluoropropylene-vinylidene fluoride copolymer.

It is therefore an object of the invention to provide a method of curing the hexafluoropropylene-vinylidene fluoride elastomeric copolymer more rapidly than is possible in conventional practice.

In accordance with the invention, it has been found that the cure of the hexafluoropropylene-vinylidene fluoride elastomeric copolymer with peroxidic compounds is remarkably accelerated by N,N'-methylene-bisacrylamide. By using this accelerator, it is possible to cure the hexafluoropropylene-vinylidene fluoride copolymer rapidly, under the ordinary conditions usually used for vulcanizing rubber, and the resulting product is found to be free from voids or blows, and has excellent chemical and mechanical properties. The industrial usefulness of the hexafluoropropylene-vinylidene fluoride copolymer is thereby greatly enhanced.

The hexafluoropropylene-vinylidene fluoride copolymer employed in the invention is described in more detail in "Vinylidene Fluoride-Hexafluoropropylene Copolymer," by S. Dixon et al., 49 Ind. Eng. Chem. 1687 (October, 1957). Usually the rubbery copolymers contain from 20 to 70% by weight of hexafluoropropylene and correspondingly 30 to 80% of vinylidene fluoride. Commercially available forms of this material, known as "Viton" (Du Pont) frequently have a molecular weight within the range of from 50,000 to 60,000, although higher viscosity types may have molecular weights of from 150,000 to about 200,000.

In practicing the invention, the elastomeric copolymer is compounded with a peroxide in conventional amounts (e.g., about 1 to 5 parts per 100 parts by weight of elastomer) along with the accelerator of the invention. In general any conventional peroxide curative, whether organic or inorganic, may be used. Examples of suitable peroxy compounds are disclosed in U.S. Patent 2,833,752, Honn et al., May 6, 1958. The peroxides employed are relatively stable at the temperature at which the elastomer is conventionally compounded, that is, the peroxide is relatively stable at temperatures below about 50° C. Benzoyl peroxide is preferred, but good results are also obtainable with di-tertiary-butyl peroxide at slightly higher curing temperatures. Less preferred are butyl hydroperoxide, dicumyl peroxide, calcium peroxide, and sodium peroxide. Tertiary-butyl perbenzoate, 2,2-di-(tertiary butyl peroxy) propane and 2,2-di(tertiary-butyl peroxy) butane may also be mentioned. Tertiary-butyl peracetate, succinic acid peroxide, or hydrogen peroxide may also be used. Conventionally the peroxide cure is also preferably activated with the aid of metal oxides such as magnesium, zinc, calcium, aluminum and lead oxide, and lead salts, such as dibasic lead phosphite, tribasic lead maleate, and tribasic lead sulfate. Zinc oxide is especially preferred, since it imparts smooth processing characteristics along with minimum scorching tendencies. These oxides or salts are also preferably employed in the present invention. They may be used in conventional, non-critical amounts, e.g., 3 parts or more, preferably about 10 parts, although very large amounts, such as 50 or more parts, may be used to function as a filler or pigment. The vulcanizable mixture may further contain various other suitable conventional compounding ingredients if desired, such as fillers (e.g. precipitated silica, zinc oxide, carbon black), softeners or plasticizers. The amount of N,N'-methylenebisacrylamide employed as an accelerator of the peroxide cure of hexafluoropropylene-vinylidene fluoride elastomer in accordance with the invention is not critical, and it may be mentioned that although definite accelerating effect may be noted with as little as about 1 part by weight in 100 parts of the copolymer, it is usually preferred to use somewhat more than this, say, by way of non-limiting example some 4 to 22 parts (preferably 5 to 15 parts), and even more may be used if desired.

The vulcanization may be carried out in a mold or press in accordance with conventional compression or injection molding procedures, or the suitably pre-formed (e.g., molded, extruded, or calendered) elastomer may be cured in an oven or autoclave at atmospheric or elevated pressure in an atomsphere of air and/or ammonia, or steam, or any suitable inert gas. The curing conditions may vary widely, depending on the exact quantity and kind of curing materials, and depending on the exact properties and degree of cure desired in the final article, and also depending on the particular equipment and procedure used, as well as the size of the article and other variables. In general it may be stated that useful cures are obtainable over much the same time and temperature ranges as may be employed in ordinary rubber vulcanization, e.g., curing times of from about 5 minutes to 24 hours at temperatures of from about 150° to 350° F., the longer times being employed with the lower temperatures.

A particularly advantageous aspect of the invention lies in the fact that by the use of the N,N-methylenebisacrylamide acceleration of the peroxide cure as described, it is possible to cure the elastomeric copolymer in essentially the same curing cycle as would be suitable for ordinary vulcanizable rubber compounds, such as Hevea stocks, GR-S stocks, etc. Therefore, the invention makes it perfectly feasible to manufacture articles in accordance with ordinary rubber factory practices. Also, it was not feasible, in accordance with prior practice, to cure the fluorocarbon elastomer in association with fabric, such as cotton fabric, because the severe conditions of required time and temperature caused extensive degradation of the fabric. The present method is readily applicable to curing fluororcarbon elastomer calendered coatings or other kinds of coatings or laminates on fabrics and the like, without danger of injuring the fabric, because relatively mild vulcanizing conditions are effective.

The fluorocarbon rubber vulcanizates produced by the method of the invention display good resistance to various solvents and reactive chemical agents. This renders the vulcanizates useful in making such articles as protective clothing, for example, boots, gloves, aprons, etc., for use by workers handling highly dangerous and reactive chemicals, including acids and strong oxidizing agents, such as fuming nitric acid. The vulcanizates are also useful for lining tanks and the like used for storing or processing solvents and other chemicals, such as fuel cells for gasoline, etc. Collapsible rubber containers or barrels for storing or transporting liquid or solid chemicals may be made of the present vulcanizates. In such articles the vulcanizate may be reinforced if desired by laminating with fabric or other materials in the same manner that conventional rubber boots are provided with a fabric lining or conventional fuel cells are provided with embedded layers of fabric.

Although the N,N'-methylenebiscrylamide is referred to herein as an accelerator of the peroxide cure of fluorocarbon elastomer, it is not intended by the use of the word "accelerator" to limit the invention to any particular mechanism or theory of operation, but the term "accelerator" is merely used in a general sense in recognition of the observed fact that the time of cure can be very much shortened when the N,N'-methylenebisacrylamide is present, while still avoiding porosity and while achieving good physical and chemical properties in the final vulcanizate. In a sense, the N,N'-methylenebisacrylamide might also be regarded as an activator of the cure, or even as a supplementary curing agent.

The following examples, in which all parts are expressed by weight, will serve to illustrate the practice of the invention in more detail.

EXAMPLE I

The fluorocarbon elastomer employed in this example was a commercial material known as "Viton A," by the Du Pont company. The molar ratio of vinylidene fluoride to hexafluoropropylene was 4 to 1. It was in the form of a gum having the following properties:

| | |
|---|---|
| Specific gravity | 1.85. |
| Fluorine content | 65%. |
| Color | White, translucent. |
| Solubility | Ketones. |
| Storage stability | Excellent — no change in Mooney viscosity after 30 days at 100° F. |
| Mooney viscosity ML-4/212° F. | 35–55. |
| Williams plasticity | 110. |
| Recovery | 15. |

The gum is mixed on a rubber mill with other ingredients, to provide the stocks shown in Table I, below. The elastomer is suitably milled at a mill roll temperature of 120–150° F. Magnesium oxide and N,N'-methylenebisacrylamide are added and blended in by milling. The peroxide is then added and blended by further milling. The compounds can be sheeted from the mill (face roll temperature 180° F.) or calender. The stocks are then cured in an oven in an air-ammonia atmosphere at a temperature of 270° F. for 2.8 hours. The physical properties of the resulting vulcanizates were then determined, with the results shown in Table I.

Table I

| Ingredients | Stock 1 | Stock 2 | Stock 3 | Stock 4 |
|---|---|---|---|---|
| Viton A | 100 | 100 | 100 | 100 |
| Magnesium Oxide | 10 | 10 | 10 | 10 |
| Benzoyl Peroxide | 2.5 | 2.5 | 2.5 | 2.5 |
| N,N'-Methylenebisacrylamide | | 5 | 10 | 15 |

PHYSICAL PROPERTIES (2.8 HOUR CURE)

| | Stock 1 | Stock 2 | Stock 3 | Stock 4 |
|---|---|---|---|---|
| Tensile (p.s.i.) | 664 | 1,013 | 1,262 | 1,930 |
| Elongation (percent) | 1,075 | 570 | 388 | 106 |
| Modulus 100% Elongation | 160 | 373 | 820 | 1,898 |
| Modulus 200% Elongation | 190 | 551 | 1,049 | |
| Modulus 300% Elongation | 215 | 719 | 1,200 | |

It will be apparent that the cure proceeded much more rapidly in the presence of N,N'-methylenebisacrylamide, and the vulcanizates made with this accelerator had remarkably superior physical properties.

EXAMPLE II

Example I was repeated, using a higher viscosity grade of Viton, known as "Viton AHV," with the results summarized in Table II.

Table II

| Ingredients | Stock 5 | Stock 6 | Stock 7 | Stock 8 |
|---|---|---|---|---|
| Viton AHV | 100 | 100 | 100 | 100 |
| Magnesium Oxide | 10 | 10 | 10 | 10 |
| Benzoyl Peroxide | 2.5 | 2.5 | 2.5 | 2.5 |
| N,N'-Methylenebisacrylamide | | 5 | 10 | 15 |

PHYSICAL PROPERTIES (2.8 HOUR CURE)

| | Stock 5 | Stock 6 | Stock 7 | Stock 8 |
|---|---|---|---|---|
| Tensile (p.s.i.) | 1,273 | 1,857 | 2,159 | 2,799 |
| Elongation (percent) | 618 | 470 | 323 | 148 |
| Modulus 100% Elongation | 182 | 431 | 1,041 | 2,508 |
| Modulus 200% Elongation | 241 | 730 | 1,552 | |
| Modulus 300% Elongation | 333 | 1,047 | 2,033 | |

EXAMPLE III

The procedure of Example I was repeated, using in place of benzoyl peroxide, a commercial tertiary-butyl peracetate preparation ("Lupersol #7," made by Novadel-Agene Corp., containing 72–76% t-butyl peracetate in thiophene-free benzene), with the results shown in Table III.

Table III

| Ingredients | Stock 9 | Stock 10 | Stock 11 |
|---|---|---|---|
| Viton A | 100 | 100 | 100 |
| Magnesium Oxide | 10 | 10 | 10 |
| N,N'-Methylenebisacrylamide | 0 | 10 | 15 |
| Lupersol #7 | 2.5 | 2.5 | 2.5 |

PHYSICAL PROPERTIES (2.8 HOUR CURE)

| | Stock 9 | Stock 10 | Stock 11 |
|---|---|---|---|
| Tensile (p.s.i.) | 189 | 336 | 495 |
| Elongation (percent) | 457 | 316 | 291 |
| Modulus 100% Elongation | 185 | 334 | 484 |
| Modulus 200% Elongation | 175 | 306 | 373 |
| Modulus 300% Elongation | 144 | 167 | 66 |

EXAMPLE IV

The foregoing examples were repeated, using tertiary-butyl perbenzoate as the peroxy curative, with the results noted in Table IV.

*Table IV*

| Ingredients | Parts | | |
|---|---|---|---|
| | Stock 12 | Stock 13 | Stock 14 |
| Viton A | 100 | 100 | 100 |
| Magnesium Oxide | 10 | 10 | 10 |
| t-Butyl Perbenzoate | 2.5 | 2.5 | 2.5 |
| N,N'-Methylenebisacrylamide | 0 | 10 | 15 |

PHYSICAL PROPERTIES (2.8 HOUR CURE)

| | | | |
|---|---|---|---|
| Tensile (p.s.i.) | 167 | 517 | 523 |
| Elongation (percent) | 497 | 357 | 315 |
| Modulus 100% Elongation | 161 | 505 | 519 |
| Modulus 200% Elongation | 162 | 495 | 480 |
| Modulus 300% Elongation | 143 | 437 | 372 |

EXAMPLE V

This demonstrates the results with succinic acid peroxide.

*Table V*

| Ingredients | Parts | | |
|---|---|---|---|
| | Stock 15 | Stock 16 | Stock 17 |
| Viton A | 100 | 100 | 100 |
| Magnesium Oxide | 10 | 10 | 10 |
| Succinic Acid Peroxide | 2.5 | 2.5 | 2.5 |
| N,N'-Methylenebisacrylamide | 0 | 10 | 15 |

PHYSICAL PROPERTIES (2.8 HOUR CURE)

| | | | |
|---|---|---|---|
| Tensile (p.s.i.) | | 301 | 360 |
| Elongation (percent) | | 277 | 316 |
| Modulus 100% Elongation | | 287 | 336 |
| Modulus 200% Elongation | | 184 | 211 |
| Modulus 300% Elongation | | 39 | 46 |

EXAMPLE VI

In this example, hydrogen peroxide was used.

*Table VI*

| Ingredients | Parts | | |
|---|---|---|---|
| | Stock 18 | Stock 19 | Stock 20 |
| Viton A | 100 | 100 | 100 |
| Magnesium Oxide | 10 | 10 | 10 |
| Hydrogen Peroxide (16.5% active oxygen) | 1.5 | 1.5 | 1.5 |
| N,N'-Methylenebisacrylamide | 0 | 10 | 15 |

PHYSICAL PROPERTIES (2.8 HOUR CURE)

| | | | |
|---|---|---|---|
| Tensile (p.s.i.) | 187 | 347 | 368 |
| Elongation (percent) | 315 | 201 | 214 |
| Modulus 100% Elongation | 180 | 302 | 296 |
| Modulus 200% Elongation | 186 | 113 | 136 |
| Modulus 300% Elongation | 132 | | |

From the foregoing, it will be apparent that the invention has many advantages. The N,N'-methylenebisacrylamide is readily blended with the fluorocarbon elastomer at temperatures sufficiently elevated for easy mastication without decomposition or rapid reaction with the elastomer. The N,N'-methylenebisacrylamide can in general be safely handled on mills and calenders. It has a low level of toxicity and apparently does not produce objectionable by-products such as obnoxious gases. The decomposition products of the curing reaction do not produce gases in large enough volume to cause blowing or porosity in the elastomer. This makes it possible to cure solid, imprevious film and slabs of the fluorocarbon elastomer.

The present accelerator promotes rapid cures of fluorocarbon elastomer at a low concentration and therefore it does not detract from the physical properties. This, coupled with its low cost, makes it a very economical accelerator. Since it is a white crystalline powder, it is ideal for light colored fluorocarbon elastomer stocks.

While it is not desired to limit the invention to any particular theory of operation, it appears possible that the N,N'-methylenebisacrylamide is activated by the peroxide to produce a free radical which in turn is more reactive than the peroxide. In this connection it is interesting to compare the structures of acrylamide and N,N'-methylenebisacrylamide:

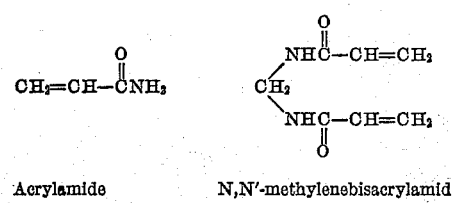

Acrylamide      N,N'-methylenebisacrylamide

One will note that the structures are identical except that in the bis compound two molecules of acrylamide are connected by a methylene group. Although the structures are similar, the acrylamide fails to accelerate the cure, whereas the N,N'-methylenebisacrylamide most surprisingly has a powerful accelerating action. This is a particularly unexpected result in that amine compounds commonly poison or neutralize the effect of peroxides. The uniqueness of this new accelerating action by N,N'-methylenebisacrylamide is emphasized by the fact that numerous tests were made in attempts to duplicate this action with other chemicals, but they all failed.

Having thus described our invention, what we claim and desire to protect by Letters Patent is:

1. A method of curing a saturated fluorocarbon elastomer, which is a copolymer of 20% to 70% of hexafluoropropylene and correspondingly 80 to 30% of vinylidene fluoride, comprising mixing 100 parts of said elastomer with from 1 to 5 parts of a peroxide curing agent, the said peroxide being stable at temperatures below 50° C., and from 4 to 22 parts of N,N'-methylenebisacrylamide as an accelerator, at a temperature of from 150° to 350° F. for a period of from 5 minutes to 24 hours, the said parts and percentages being by weight.

2. A method as in claim 1, in which the said peroxide is an organic peroxide.

3. A method as in claim 2, in which the said organic peroxide is benzoyl peroxide.

4. A method of curing saturated fluorocarbon elastomer which is a copolymer of 20% to 70% of hexafluoropropylene and correspondingly 80 to 30% of vinylidene fluoride, comprising heating 100 parts of said elastomer at a temperature of from 150° to 350° F. for a period of from 5 minutes to 24 hours in admixture with from 1 to 5 parts of benzoyl peroxide as a curing agent, from 5 to 15 parts of N,N'-methylenebisacrylamide as an accelerator, and from 3 to 50 parts of magnesium oxide, the said parts and percentages being by weight.

5. A vulcanizate comprising 100 parts of a saturated fluorocarbon elastomer which is a copolymer of 20% to 70% of hexafluoropropylene and correspondingly 80% to 30% of vinylidene fluoride, cured with from 1 to 5 parts of a peroxide as a curing agent and from 4 to 22 parts of N,N'-methylenebisacrylamide as an accelerator, the said peroxide being stable at temperatures below 50° C., and the said parts and percentages being by weight.

6. A vulcanizate as in claim 5, in which the peroxide is benzoyl peroxide.

7. A vulcanizate as in claim 6, containing from 3 to 50 parts of magnesium oxide.

References Cited in the file of this patent
UNITED STATES PATENTS

Dixon et al.: volume 49, page 1687, Ind. Eng. Chem., October 1957.